(12) United States Patent
Watanabe et al.

(10) Patent No.: US 9,275,461 B2
(45) Date of Patent: Mar. 1, 2016

(54) INFORMATION PROCESSING APPARATUS, INFORMATION PROCESSING METHOD AND STORAGE MEDIUM

(71) Applicant: CANON KABUSHIKI KAISHA, Tokyo (JP)

(72) Inventors: Daisuke Watanabe, Yokohama (JP); Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/972,212

(22) Filed: Aug. 21, 2013

(65) Prior Publication Data

US 2014/0067126 A1     Mar. 6, 2014

(30) Foreign Application Priority Data

Aug. 28, 2012  (JP) ................................. 2012-188074
Jun. 4, 2013   (JP) ................................. 2013-118301

(51) Int. Cl.
*G06K 9/00*    (2006.01)
*G06T 7/00*    (2006.01)
*B25J 9/16*    (2006.01)

(52) U.S. Cl.
CPC ............. *G06T 7/0046* (2013.01); *B25J 9/1697* (2013.01); *G06T 2200/04* (2013.01); *G06T 2207/10028* (2013.01); *G06T 2207/20016* (2013.01); *G06T 2207/30164* (2013.01); *Y10S 901/47* (2013.01)

(58) Field of Classification Search
CPC ..................................... G06T 7/00; B25J 9/16
See application file for complete search history.

(56) References Cited

U.S. PATENT DOCUMENTS

| 8,520,931 | B2 * | 8/2013 | Tateno | ........................... 382/154 |
| 8,786,700 | B2 * | 7/2014 | Kobayashi et al. | ........... 348/139 |
| 2008/0205721 | A1 * | 8/2008 | Udupa | ................. G06K 9/6209 382/128 |
| 2011/0262007 | A1 * | 10/2011 | Kojima | .............. G01B 11/2509 382/103 |
| 2012/0033071 | A1 | 2/2012 | Kobayashi et al. | |
| 2012/0262455 | A1 | 10/2012 | Watanabe et al. | |
| 2012/0268567 | A1 * | 10/2012 | Nakazato et al. | ............... 348/46 |
| 2012/0294534 | A1 | 11/2012 | Watanabe et al. | |
| 2013/0051626 | A1 * | 2/2013 | Abadpour et al. | ............ 382/106 |
| 2014/0067126 | A1 * | 3/2014 | Watanabe et al. | ............. 700/259 |

FOREIGN PATENT DOCUMENTS

JP         2009-020671 A       1/2009

OTHER PUBLICATIONS

T. Oishi et al., "Fast Simultaneous Alignment of Multiple Range Images Using Index Images", Institute of Industrial Science, vol. J89-D, No. 3, pp. 513-521.
K. Arun et al., "Least-Squares Fitting of Two 3-D Point Sets", PAMI, vol. 9, No. 5, 1987.
K. Tateno et al., "A Model Fitting Method Using Intensity and Range Images for Bin-Picking Applications", vol. J94-D, No. 8, pp. 1410-1422, 2011.
T. Drummond et al., "Real-Time Visual Tracking of Complex Structures", IEEE Transactions on Pattern Analysis and Machine Intelligence, vol. 24, No. 7, pp. 932-946, 2002.

* cited by examiner

*Primary Examiner* — Gregory M Desire
(74) *Attorney, Agent, or Firm* — Fitzpatrick, Cella, Harper & Scinto

(57) ABSTRACT

There is provided with an information processing apparatus. An image including a target object is acquired. A coarse position and orientation of the target object is acquired. Information of a plurality of models which indicate a shape of the target object with different accuracy is held. A geometrical feature of the target object in the acquired image is associated with a geometrical feature indicated by at least one of the plurality of models placed at the coarse position and orientation. A position and orientation of the target object is estimated based on the result of association.

17 Claims, 10 Drawing Sheets

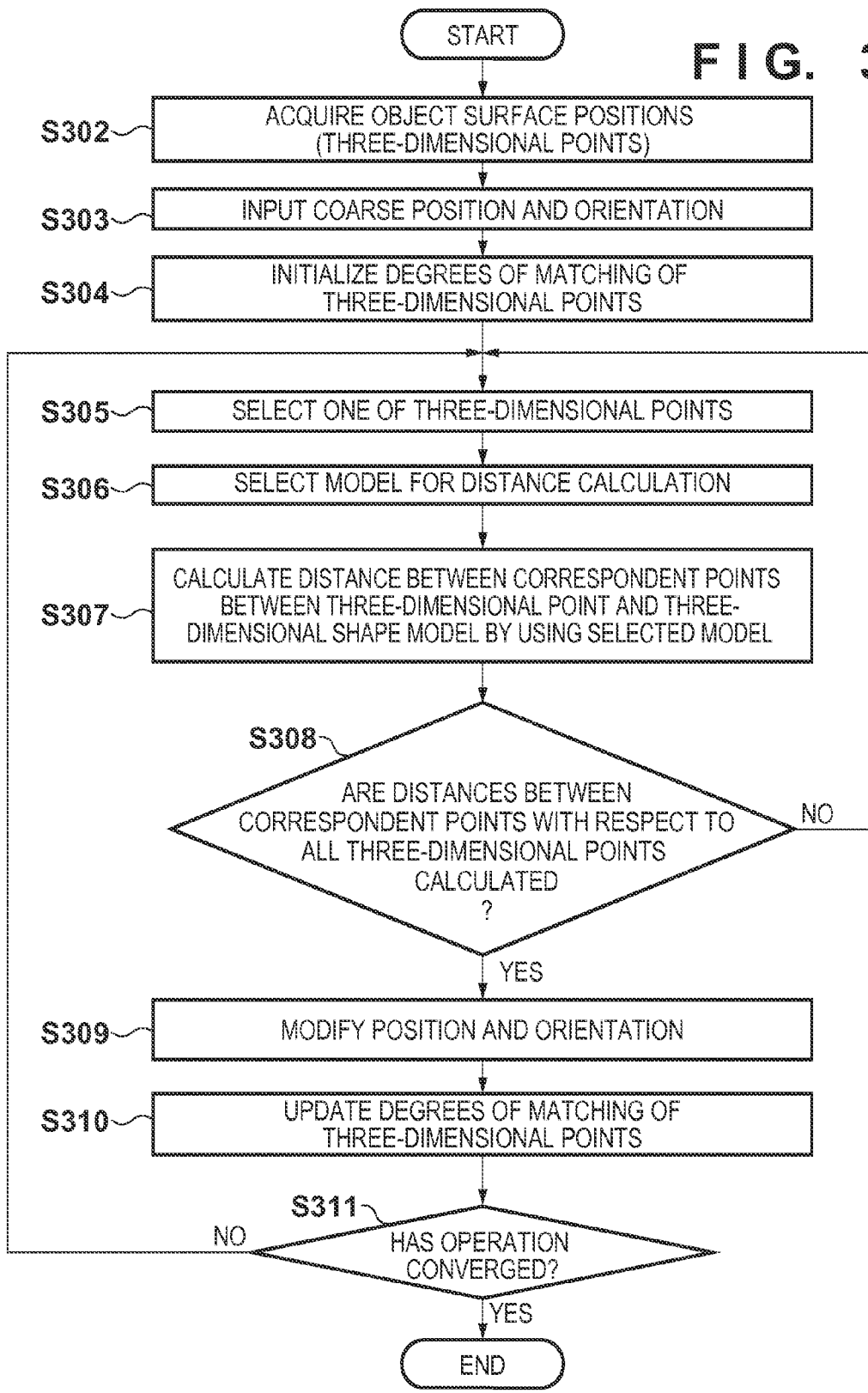

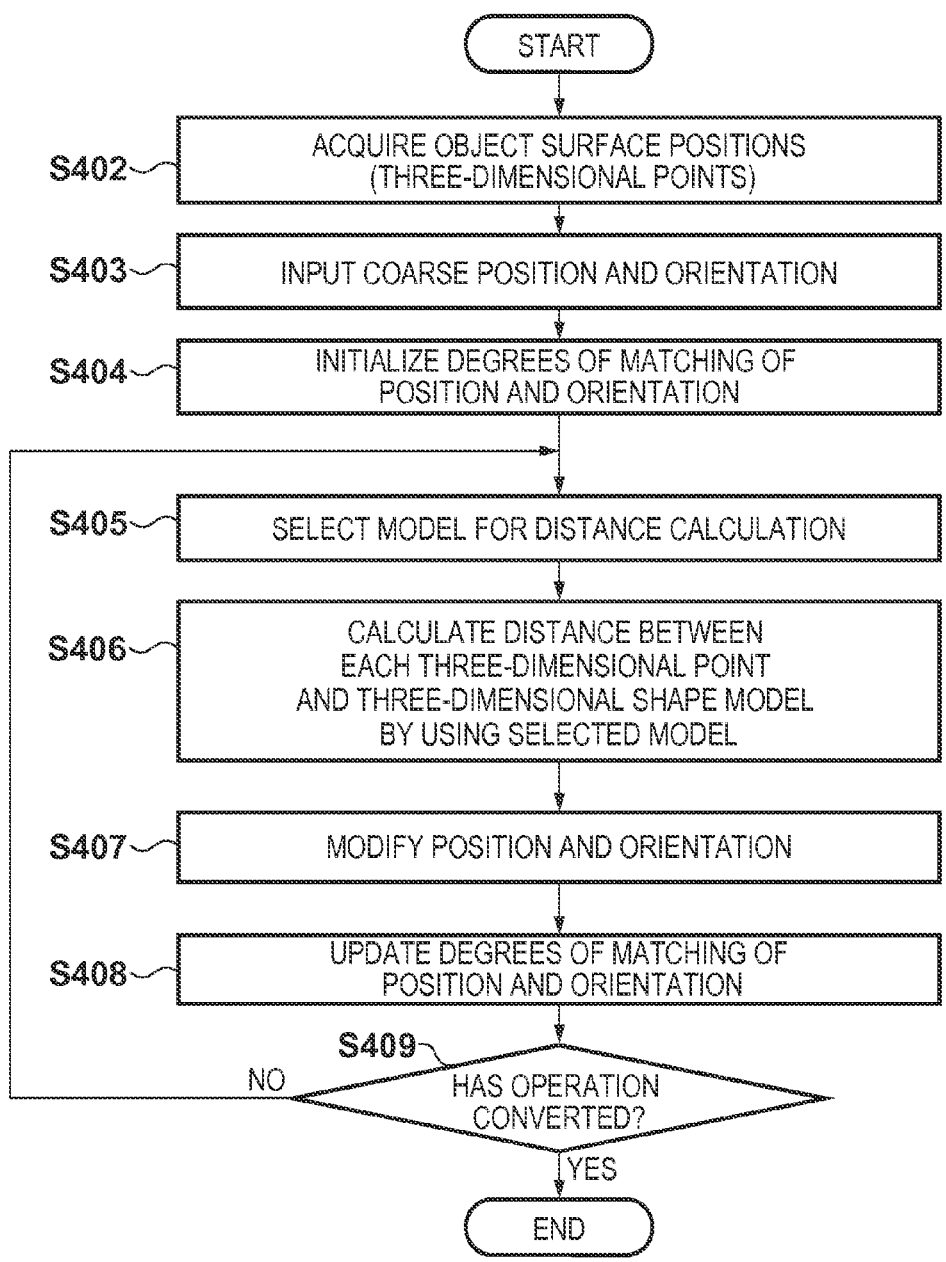

INFORMATION PROCESSING APPARATUS, INFORMATION PROCESSING METHOD AND STORAGE MEDIUM

BACKGROUND OF THE INVENTION

1. Field of the Invention

The present invention relates to a technique of acquiring the position and orientation of a target object having a three-dimensional shape.

2. Description of the Related Art

There is available a technique called Model-Based Vision which obtains the correspondence between a three-dimensional point acquired from the surface position of a target object by range imaging or the like and a geometrical feature extracted from a three-dimensional shape model of the target object and estimates the position and orientation of the target object by using the distance between the correspondent points as an evaluation function. This technique requires a three-dimensional shape model of a target object in advance to estimate position and orientation parameters. Methods of obtaining such three-dimensional shape models include a method using the design data obtained by CAD software and a method using a polygon model imitating (approximating) the shape of a target object.

CAD data representing the shape of an object expresses the shape by combining a plurality of partial shapes expressed by parameters. Each partial shape is constituted by a surface and a curve defining the contour of the surface. Each surface is expressed by an analytical curved surface such as a circular cone or torus curved surface, or a free curved surface such as a B-Spline curved surface or NURBS curved surface. The surface expressed by these parameters has a merit of being capable of expressing a complex curved surface shape with a small amount of information. Therefore, geometrical features on a model can be calculated with high accuracy in estimation of the position and orientation of an object by using the parameters for each surface which CAD data has, and thus an accurate processing will be enabled. This makes it possible to perform processing with high accuracy. On the other hand, this processing requires complex geometrical calculations for free curved surfaces such as NURBS curved surfaces when calculating points on surfaces or performing correspondence search with three-dimensional points. In addition, when performing inside/outside determination with respect to a contour line, it is necessary to perform complex calculations, resulting in a long processing time.

On the other hand, a polygon model expresses an object shape by a combination of polygonal surfaces. A polygon model allows the calculation of points on surfaces and correspondence search using three-dimensional points with simple geometrical calculations, and has a merit of being low in calculation load. In contrast to this, since an object shape is polygonally approximated, a difference occurs between the object shape and the model. There is available a method of reducing this difference by approximating a surface with a set of very small polygons. However, the total number of polygons required exponentially increases as an allowable difference decreases.

As countermeasures against problems in the respective models, there are available methods of implementing high-speed, accurate processing by combining a model expressed by parameters such as CAD data and a polygon model.

For example, Japanese Patent Laid-Open No. 2009-020671 discloses a method of holding, in advance, a model comprising a combination of parameters expressing a curved surface shape and a polygon model approximating the shape, and using that in calculating a distance value from the reference surface to the curved surface shape with respect to each vertex of a lattice on the reference surface. This method derives the coordinates of the intersection points between polygons and straight lines extending from the respective lattice points vertically to a reference surface, and then calculates the distances from the intersection points to a curved surface shape from curved surface parameters, thereby correcting the distances from the vertices to the curved surface shape.

When calculating the distances between the respective lattice points on a reference surface and a curved surface, the above method calculates coarse distances via polygons at high speed first, and then modifies the coarse distances by calculating accurate distances to the curved surface associated with the polygons from curved surface parameters, thereby satisfying both the requirements for high speed and high accuracy. This method obtains the correspondence relationship between the respective lattice points on a reference surface and a model. However, the method does not perform correspondence search with points in an arbitrary three-dimensional space, and hence cannot be directly applied to the positioning between the model and the three-dimensional points obtained from a range image of the target object.

SUMMARY OF THE INVENTION

According to one embodiment, an information processing apparatus comprises: an image acquisition unit configured to acquire an image including a target object; a unit configured to acquire a coarse position and orientation of the target object; a holding unit configured to hold information of a plurality of models which indicate a shape of the target object with different accuracy; an associating unit configured to associate a geometrical feature of the target object in the acquired image with a geometrical feature indicated by at least one of the plurality of models placed at the coarse position and orientation; and an estimation unit configured to estimate a position and orientation of the target object based on the result of association.

According to another embodiment, an information processing method comprises: acquiring an image including a target object; acquiring a coarse position and orientation of the target object; holding information of a plurality of models which indicate a shape of the target object with different accuracy; associating a geometrical feature of the target object in the acquired image with a geometrical feature indicated by at least one of the plurality of models placed at the coarse position and orientation; and estimating a position and orientation of the target object based on the result of association.

According to still another embodiment, a non-transitory storage medium storing a program for instructing a computer to: acquire an image including a target object; acquire a coarse position and orientation of the target object; hold information of a plurality of models which indicate a shape of the target object with different accuracy; associate a geometrical feature of the target object in the acquired image with a geometrical feature indicated by at least one of the plurality of models placed at the coarse position and orientation; and estimate a position and orientation of the target object based on the result of association.

Further features of the present invention will become apparent from the following description of exemplary embodiments (with reference to the attached drawings).

BRIEF DESCRIPTION OF THE DRAWINGS

FIG. 3 is a flowchart showing processing performed by an information processing apparatus 1;

FIG. 4 is a flowchart showing processing performed by the information processing apparatus 1;

DESCRIPTION OF THE EMBODIMENTS

Figure 1:
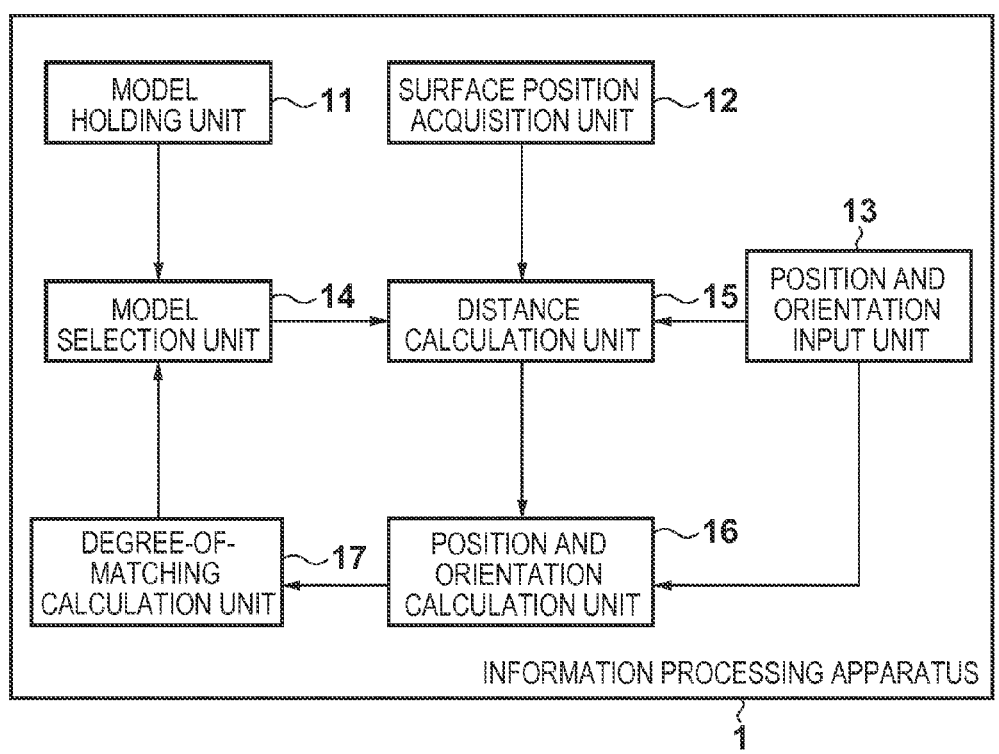
FIG. 1 is a block diagram showing an example of the functional arrangement of an information processing apparatus 1.

The exemplary embodiments of the present invention will be described below with reference to the accompanying drawings. Note that the embodiments described below each are an example of concrete execution of the present invention and are one of concrete embodiments of the arrangement described in the scope of claims.

According to several embodiments, it is possible to accurately calculate the distance between the correspondent points between a target object and a model imitating the shape of the target object at high speed.

Several embodiments are configured to select model information used in processing from a plurality of pieces of model information which differ in reproducibility for a target object shape. By selecting model information suitable for processing, the distance between the correspondent points of a target object and a model imitating the shape of the target object can be calculated accurately at high speed. More specifically, in the first embodiment, pieces of model information to be used are switched in accordance with defined conditions based on, for example, a residual difference or modification count. In the first embodiment and its modification, when modifying position and orientation information by iterative operation, it is possible to use different pieces of model information in the respective repetitions. In addition, in the first embodiment and its modification, when calculating the distance between the correspondent points, it is possible to use different pieces of model information at the respective points on a target object. In the second embodiment and its modification, it is possible to select model information for determining the correspondence relationship between a target object and a model surface and another model information for calculating the distance between the target object and the model surface. As described above, in the following embodiments, when performing positioning between a target object and a model imitating the shape of the target object, it is possible to perform processing by simultaneously using a plurality of pieces of model information.

First Embodiment

This embodiment is directed to the processing of obtaining the position and orientation of a target object by using the three-dimensional points (points on a surface of the target object) obtained from a range image of the target object whose position and orientation should be obtained and a model approximating the shape of the target object. At this time, a polygon model approximating the shape of a target object with polygons, and a piecewise parametric curved surface model approximating the shape of the target object with a parametric curved surface, are switched for use for each three-dimensional point, in this embodiment.

It is possible to search for correspondent points corresponding to the respective three-dimensional points on a surface of a target object by using a polygon model at higher speed than by using a piecewise parametric curved surface model. However, since the shape of the polygon model includes an approximation difference from the shape of the target object, it is not possible to accurately calculate the distances between correspondent points between the target object and the polygon model.

Using a piecewise parametric curved surface model can accurately calculate the above distances. However, since it is necessary to determine an effective region representing an object shape on each parametric curved surface, it takes much time to perform calculations.

In this embodiment, if the differences between a currently used model and three-dimensional points are large, a polygon model is selected as a model to be used next to perform position and orientation calculation at high speed. If the differences between a currently used model and three-dimensional points are small, a piecewise parametric curved surface model is selected as a model to be used next in order to perform position and orientation calculation with high accuracy.

Note that this embodiment is configured to execute positioning by repeating position and orientation modification so as to minimize the distance between the correspondent points between a three-dimensional point on an object surface and a model surface. A residual difference in positioning with respect to a three-dimensional point is used as an index indicating the fitting degree of position and orientation, in this embodiment. The residual difference in this case is the distance between a three-dimensional point and a point on a three-dimensional shape model surface at a modified position and orientation. If the residual difference is large, it is determined that the offset of the estimated position and orientation is large. If the residual difference is small, it is determined that the offset is small. This makes it possible to calculate a position and orientation while satisfying both the requirements for high processing speed and high accuracy by switching between a polygon model and a piecewise parametric model for each three-dimensional point in accordance with the residual difference with respect to each three-dimensional point.

An example of the functional arrangement of an information processing apparatus 1 according to this embodiment will be described first with reference to the block diagram of FIG. 1. A model holding unit 11 holds the model information of a polygon model as a model approximating the shape of a target object as a position and orientation measurement target by using polygons and the model information of a piecewise parametric curved surface model as a model approximating the shape of the target object by using parametric curved surfaces. A polygon model and a piecewise parametric curved surface model will be described below with reference to FIGS. 2A and 2B. FIGS. 2A and 2B respectively show a piecewise parametric curved surface model (FIG. 2A) and a polygon model (FIG. 2B) corresponding to the same target object.

As shown in FIG. 2A, a piecewise parametric curved surface model is a model accurately expressing a target object by combining a plurality of parametrically expressed surfaces delimited by boundaries (piecewise parametric surfaces). This embodiment handles surfaces called trimmed curved surfaces as piecewise parametric surfaces. A trimmed curved surface is a surface defined by parameters expressing a base curved surface representing a basic shape and a contour curve defining an effective region on the base curved surface. This expression method is configured to express the coordinates (x, y, z) of a point P in a three-dimensional space by using two parameters u and v moving in a region within a plane according to three continuous functions: x=f(u, v), y=g(u, v), and z=h(u, v). Defining an effective region using curves on a uv plane relative to the base curved surface represented by this expression will express a partial shape of the target object. Referring to FIG. 2A, the hatched portion shows an example of a trimmed curved surface. Note that the base curved surface of a trimmed curved surface is sometimes expressed by an analytical curved surface such as a sphere, circular cone, or torus curved surface or a free curved surface such as a B-Spline curved surface, NURBS curved surface, or Bezier curved surface. General CAD data is formed by the above piecewise parametric curved surface model. If, therefore, it is possible to obtain the CAD data of a target object from data in a standardized format such as IGES or STEP, it is possible to directly use the data as a piecewise parametric curved surface model. Note however that it is possible to use data other than CAD data as a piecewise parametric curved surface model. For example, this embodiment may use a model expressing a target object by a combination of segmented implicit function curved surfaces. In addition, the embodiment may use any type of base curved surface which can accurately express the shape of a target object by numerical calculation using parameters and to calculate a point on a surface which is located at the shortest distance from a point (three-dimensional point) provided with a three-dimensional coordinate value and the distance between them.

A polygon model will be described next. As shown in FIG. 2B, a polygon model is a model approximately expressing the shape of a target object by a set of triangular polygons. A polygon model can be acquired by discretely sampling points on a curved surface from CAD data and coupling the sampled points. A polygon model is represented by the three-dimensional coordinate values of the vertices of each polygon and the coupling information of the vertices constituting each polygon. Note that a polygon may be a rectangle or pentagon instead of a triangle. This embodiment may use any other type of polygon which can be expressed by the coordinates of the vertices of a surface and the coupling information of the vertices constituting the surface.

A surface position acquisition unit 12 acquires the positions (having three-dimensional coordinate values) of points (three-dimensional points) on a surface of a target object. This embodiment is configured to obtain the position of a three-dimensional point corresponding to each pixel of a range image, obtained by imaging a target object using a distance sensor, from the coordinate position of each pixel and the pixel value (depth value) of the pixel. It is possible to use, as a distance sensor, an active type sensor designed to measure a distance by triangulation by imaging reflected light of laser light applied to a target object or slit light/random dot pattern light. As an active type distance measurement method, a spatial encoding method may be used. The distance sensor to be used is not limited to this, and a sensor based on a Time-of-flight scheme using the flight time of light may be used. Alternatively, a passive type sensor may be used, which calculates the depth value of each pixel from the image captured by a stereo camera by triangulation. However, the method of acquiring the positions of three-dimensional points on a surface of a target object is not limited to the above methods, and various methods can be used. For example, this embodiment may acquire three-dimensional points on a surface of a target object by using a contact type three-dimensional measurement apparatus which acquires the positions of the three-dimensional points by bringing a probe into contact with the surface.

A position and orientation input unit 13 supplies position and orientation information indicating the coarse position and orientation of a target object to a distance calculation unit 15 and a position and orientation calculation unit 16. The position and orientation calculation unit 16 modifies the position and orientation information by the processing to be described later. Upon acquiring this modified position and orientation information, the position and orientation input unit 13 supplies the acquired position and orientation information to the distance calculation unit 15 and the position and orientation calculation unit 16 again. Note that the position and orientation information supplied to the distance calculation unit 15 and the position and orientation calculation unit 16 is not limited to the position and orientation information modified by the position and orientation calculation unit 16. For example, this information may be that obtained by estimating the amount of change in position and orientation based on a past position and orientation calculation result and predicting the current position and orientation from the past position and orientation and the estimated amount of change. If the coarse position and orientation where a target object is placed are known in advance, the corresponding values may be used as a coarse position and orientation. In addition, a magnetic or optical position and orientation sensor may be attached to a measurement target object to measure the position and orientation of the object. Alternatively, a marker having a predetermined shape may be attached to an object. A camera captures an image of the marker to calculate the position and orientation of the object.

Assume that the position and orientation of a target object and the positions of three-dimensional points are those in a coordinate system (reference coordinate system) with the position of the above distance sensor being the origin, the horizontal and vertical directions of a range image being the x- and y-axes, respectively, and the optical axis of the distance sensor being the z-axis, unless otherwise specified. In addition, a model is provided with a coordinate system (model coordinate system) with one point given to the model being the origin and three axes perpendicular to each other at the origin being the x-, y-, and z-axes, respectively.

A model selection unit 14 selects, as selected model information from the model holding unit 11 for each three-dimensional point on a surface of a target object, one of polygon model information and piecewise parametric curved surface model information which is decided in accordance with the degree of matching obtained by a degree-of-matching calculation unit 17 for each three-dimensional point.

The distance calculation unit 15 obtains the distance between each three-dimensional point (geometrical feature) on the surface of the target object and a correspondent point (geometrical feature) corresponding to the three-dimensional point on a model represented by selected model information selected for the three-dimensional point when the model is placed at the position and orientation indicated by position and orientation information. When using a polygon model, the distance calculation unit 15 obtains the distance between the three-dimensional point and one point on a polygon by searching for the correspondence between the three-dimensional point and the polygon. When using a piecewise parametric curved surface model, the distance calculation unit 15 searches for the correspondence between a point and a curved surface to obtain the distance between the corresponding curved surface and the three-dimensional point.

The position and orientation calculation unit 16 modifies the current position and orientation information so as to optimize the evaluation value based on the distance obtained for each three-dimensional point by the distance calculation unit 15.

The degree-of-matching calculation unit 17 obtains a residual difference with respect to each three-dimensional point on a surface of a target object. A residual difference with respect to each three-dimensional point is the distance between the three-dimensional point and a correspondent point corresponding to the three-dimensional point on a model based on the selected model information selected for the three-dimensional point when the model is placed at the position and orientation indicated by the position and orientation information modified by the position and orientation calculation unit 16.

The processing performed by the information processing apparatus 1 to obtain the position and orientation of a target object by repeatedly modifying position and orientation information by the above iterative operation will be described next with reference to the flowchart of FIG. 3, which shows the processing.

<Processing in Step S302>

The surface position acquisition unit 12 acquires, from a range image, the positions (including three-dimensional coordinate values) of the respective points (three-dimensional points) on a surface of a target object as a position and orientation measurement target in the above manner. Assume that in the following description, the surface position acquisition unit 12 has acquired the positions of N (N is an integer equal to or more than 2) three-dimensional points $kc\_i$ ($i=1, 2, \ldots, N$) in a reference coordinate system. Assume also that the correspondence relationship between a pixel in a range image and a three-dimensional point corresponding to the pixel is known.

<Processing in Step S303>

As described below, this embodiment is configured to obtain the position and orientation of a target object by providing position and orientation information indicating the coarse position and orientation of the target object and repeatedly modifying the information. In step S303, the position and orientation input unit 13 acquires position and orientation information representing the coarse position and orientation of a target object in a reference coordinate system as an initial value for this repetitive processing.

<Processing in Step S304>

The degree-of-matching calculation unit 17 initializes residual difference $er\_i$ ($i=1, 2, \ldots, N$) as a degree of matching with respect to each three-dimensional point on the surface of the target object. The degree-of-matching calculation unit 17 sets a sufficiently large value (for example, 1000) as the initial value of each residual difference.

<Processing in Step S305>

The model selection unit 14 selects one of N three-dimensional points which has not been selected.

<Processing in Step S306>

The model selection unit 14 compares a threshold $\theta$ and the residual difference $er\_i$ with respect to the three-dimensional point $kc\_i$ selected in step S305. The threshold $\theta$ to be set in advance is the shape difference value between a polygon model and a piecewise parametric curved surface model. For example, when using CAD data as a piecewise parametric curved surface model and generating a polygon model by performing tessellation processing for the CAD data, this apparatus sets the allowable value of the distance between the generated polygon and a curved surface as a polygon approximation difference. This polygon approximation difference may be used as the threshold $\theta$.

If the above comparison result indicates that $er\_i \geq \theta$, the position and orientation information at this time point may still include a large difference. In such a case, therefore, the model selection unit 14 selects a polygon model allowing fast geometric calculation as a model used to obtain a distance between the correspondent points with respect to three-dimensional point $kc\_i$ from the model holding unit 11.

On the other hand, if $er\_i < \theta$, a residual difference with respect to the three-dimensional point in position and orientation information at this time point is regarded to be similar to (less than) a model approximation difference. In this case, therefore, the model selection unit 14 selects a piecewise parametric curved surface model accurately expressing a shape as a model used to obtain the distance between the correspondent points with respect to the three-dimensional point $kc\_i$ from the model holding unit 11.

<Processing in Step S307>

The distance calculation unit 15 places the model selected with respect to the three-dimensional point $kc\_i$ at the position and orientation indicated by the current position and orientation information and obtains a distance (distance between the correspondent points) $d\_i$ between the three-dimensional point $kc\_i$ and a correspondent point $pm\_i$ corresponding to the three-dimensional point on the placed model. The distance calculation unit 15 uses different methods of obtaining the distance between the correspondent points depending on whether the model selected with respect to the three-dimensional point $kc\_i$ is a polygon model or piecewise parametric curved surface model. The following will describe methods of calculating the distance between the correspondent points when selecting a polygon model and when selecting a piecewise parametric curved surface model.

<<When Polygon Model is Selected>>

First of all, the apparatus searches for a polygon corresponding to the three-dimensional point $kc\_i$ from a polygon model. In this case, the apparatus performs correspondence search at high speed by projecting a polygon model on a range image as in the method disclosed in the following literature (Oishi, Nakazawa, and Ikeuchi, "Fast Simultaneous Alignment of Multiple Range Images Using Index Images", vol. J89-D, no. 3, pp. 513-521, 2006).

First of all, the apparatus places a polygon model at the position and orientation indicated by the current position and orientation information and renders the polygon model in an image buffer (the memory in the information processing apparatus 1) having the same size as that of a range image based on internal parameters (perspective projection parameters) of a distance sensor which has already been calibrated. At this time, the apparatus performs rendering while assigning a unique color to each polygon. This makes it possible to identify polygons projected at the respective pixels (the same positions) on a range image with colors. Note that the apparatus may perform rendering processing for the polygons on a GPU (Graphics Processing Unit) at high speed and read out the image as the rendering result. The apparatus then associates the three-dimensional point $kc\_i$ corresponding to a pixel on the range image with the polygon projected on the pixel.

The apparatus then transforms the position of the three-dimensional point $kc\_i$ into a position $km\_i$ in the model coordinate system of the polygon model and searches for the position of the foot of a vertical line extending from the position km_i to a polygon associated with the three-dimensional point kc_i as the position of the correspondent point pm_i. The apparatus obtains the distance between the position km_i and the position of the correspondent point pm_i as the distance d_i.

Note that the method of associating the three-dimensional point kc_i with a point on a polygon is not limited to this method. For example, the apparatus may use a method called normal shooting, which searches for a polygon intersecting with a normal direction from a three-dimensional point. In this method, the apparatus calculates a normal line at each three-dimensional point from the mesh obtained by coupling three-dimensional points of adjacent pixels of a range image. The apparatus searches for a polygon intersecting first with a straight line from each three-dimensional point in the normal direction, upon matching the coordinate system of a polygon model with that of each three-dimensional point based on a coarse position and orientation, and associates the intersecting polygon with the corresponding three-dimensional point. Alternatively, the apparatus may uniformly sample points on a polygon in advance, match the coordinate system of a polygon model with that of a three-dimensional point based on a coarse position and orientation, and use a nearest neighbor search method of associating the three-dimensional point with a polygon to which the point nearest to the three-dimensional point belongs. Note that it is possible to speed up the processing of normal shooting or association based on nearest neighbor search by performing a search by constructing in advance kd-tree for classifying bounding boxes including the respective three-dimensional points and the respective polygons and using kd-tree. Alternatively, the apparatus may uniformly sample points on a polygon of a polygon model in advance, project these points on a range image based on a coarse position and orientation, and associate a three-dimensional point linked to a projected pixel with a polygon as a sampling source. The apparatus may use any method which can uniquely associate a three-dimensional point with a polygon of a polygon model, including an association method capable of performing processing at high speed.

<<When Piecewise Parametric Curved Surface Model is Selected>>

The apparatus searches for a trimmed curved surface corresponding to the three-dimensional point kc_i from a piecewise parametric curved surface model, and calculates the distance from the three-dimensional point kc_i to the curved surface. Let M be the total number of trimmed curved surfaces constituting a piecewise parametric curved surface model. First of all, by using parameters for each trimmed curved surface, the apparatus calculates the position km_i transformed into that in the model coordinate system, the shortest distance to each curved surface, and a point on each curved surface which is located at the shortest distance, for each of the M trimmed surfaces. At this time, the apparatus calculates each point such that the calculated point exists within an effective region of the object shape. Note that when performing these calculations, the apparatus may use a general method of calculating a correspondent point on a curved surface which corresponds to the three-dimensional point kc_i and the distance between the correspondent points from curved surface parameters. In this case, let dt_j be the shortest distance between the jth trimmed curved surface and the three-dimensional point kc_i and pt_j be a point located at the distance. The apparatus then selects a trimmed curved surface with the minimum value of dt_j from the M trimmed curved surfaces. The apparatus obtains the distance d_i between the selected trimmed curved surface and the three-dimensional point kc_i and the position of a point located at the distance as the correspondent point pm_i.

<Processing in Step S308>

In step S308, the model selection unit 14 determines whether it has selected all the N three-dimensional points. If the model selection unit 14 determines that it has selected all the N three-dimensional points, the process advances to step S309. If there is any three-dimensional point which has not been selected, the process returns to step S305.

<Processing in Step S309>

The position and orientation calculation unit 16 modifies the position and orientation information with respect to the three-dimensional points obtained from the range image such that the model selected for each three-dimensional point is fit in a three-dimensional space. This embodiment obtains position and orientation information indicating the position and orientation of the target object by modifying the position and orientation information by iterative operation using a nonlinear optimization method.

In step S309, the position and orientation calculation unit 16 calculates the position and orientation of the target object with respect to the three-dimensional points obtained from the range image such that the three-dimensional shape model is fitted in the three-dimensional space.

Let P be surface points on a three-dimensional geometrical model.

$$P=\{pm\_1,pm\_2,\ldots,pm\_N\} \quad (1)$$

Let K be a group of range image points.

$$K=\{km\_1,km\_2,\ldots,km\_N\} \quad (2)$$

The position and orientation calculation unit 16 transforms the surface points P on the three-dimensional geometrical model into the range points K. Letting $b_i \in K$ be a point of the points K which is nearest to each point pi of the points P, it is possible to define an error function according to equation (3). Let R and t be an orientation parameter and a moving vector, respectively.

$$E(R, t) = \sum_{i=1}^{N_P} \|b_i - (Rp_i + t)\|^2 \quad (3)$$

The position and orientation calculation unit 16 obtains R and t which reduce an error function E and performs modification according to mathematical expression (4):

$$P \leftarrow RP+t \quad (4)$$

A method of obtaining R and t which reduce the error function E is disclosed in the following literature:

K. S. Arun, T. S. Huang, and S. D. Blostein, "Least-Squares Fitting of Two 3-D Point Sets", PAMI, vol. 9, no. 5, 1987

In this step, the position and orientation calculation unit 16 may calculate the position and orientation of the target object by using a nonlinear optimization method such as a Gauss-Newton method instead of the ICP method. In this case, the position and orientation calculation unit 16 optimizes the position and orientation based on the distance d_i between the correspondent points of each three-dimensional point kc_i, calculated in step S307, and the correspondent point pm_i. More specifically, the position and orientation calculation unit 16 expresses the distance d_i calculated in step S307 by linear approximation using pm_i as a function of a small change in position and orientation, and establishes a linear equation based on each measurement data so as to reduce the distance to 0.

The position and orientation calculation unit 16 obtains a small change in the position and orientation of the target object by solving these linear equations as simultaneous equations, thereby modifying the position and orientation. Note that the nonlinear optimization method is not limited to the Gauss-Newton method. For example, the position and orientation calculation unit 16 may use the Levenberg-Marquardt method based on robust calculations or the steepest descent method which is a simpler method. Alternatively, the position and orientation calculation unit 16 may use other nonlinear optimization methods such as the conjugate gradient method and the ICCG method.

In this case, the position and orientation calculation unit 16 modifies the position and orientation so as to minimize a distance value as an evaluation function. However, the optimization method to be used is not limited to this. For example, the position and orientation calculation unit 16 may use the method disclosed in Tateno, Kotake, and Uchiyama, "A Model Fitting Method Using Intensity and Range Images for Bin-Picking Applications", vol. J94-D, no. 8, pp. 1410-1422, 2011. That is, the position and orientation calculation unit 16 may modify the position and orientation by this method so as to maximize the likelihood calculated based on the distance as an evaluation value. In addition, the position and orientation calculation unit 16 may use any nonlinear optimization method which modifies a position and orientation so as to optimize an evaluation value.

The above description focuses on the iterative solution technique of obtaining a modification amount for position and orientation information as an unknown parameter and calculating the final position and orientation by repeatedly modifying a coarse position and orientation based on the obtained modification amount. However, the position and orientation calculation unit 16 may directly calculate an unknown parameter from the correspondence result searched out based on a coarse position and orientation by using six degrees of freedom expressing the position and orientation of the target object with respect to the distance sensor as an unknown parameter. This method directly calculates the final position and orientation from many correspondence relationships based on the coarse position and orientation by using the least square method.

<Processing in Step S310>

The degree-of-matching calculation unit 17 obtains the residual difference $er\_i$ with respect to each three-dimensional point $kc\_i$. The degree-of-matching calculation unit 17 places the model represented by the model information selected for the three-dimensional point $kc\_i$ at the position and orientation indicated by the position and orientation information modified in step S309 and obtains the distance between the three-dimensional point $kc\_i$ and a correspondent point on the placed model which corresponds to the three-dimensional point $kc\_i$. The obtained distance is the residual difference $er\_i$ with respect to the three-dimensional point $kc\_i$.

That is, the degree-of-matching calculation unit 17 places the model selected for the three-dimensional point $kc\_i$ at the position and orientation indicated by the modified position and orientation information, and obtains, as the residual difference $er\_i$, the distance between the position $km\_i'$ of the three-dimensional point $kc\_i$, transformed into a position in the model coordinate system of the model, and the correspondent point $pm\_i$ obtained in step S307.

<Processing in Step S311>

The position and orientation calculation unit 16 determines whether the above iterative operation has converged. Upon determining that the operation has converted, the position and orientation calculation unit 16 terminates this iterative operation, and outputs the position and orientation information obtained at this time point as position and orientation information representing the position and orientation of the target object. The output destination is not limited to a specific output destination. The position and orientation calculation unit 16 may output this information to an appropriate memory inside/outside the information processing apparatus 1 or a proper external apparatus. If the position and orientation calculation unit 16 determines that the operation has not converged, the process returns to step S305.

When performing convergence determination, the position and orientation calculation unit 16 may determine that the operation has converged, if the sum of differences with respect to all the three-dimensional points or the amount of modification of the position and orientation becomes equal to or less than a predetermined value. Alternatively, if the position and orientation calculation unit 16 has executed modification processing for the position and orientation a predetermined number of times or more, the position and orientation calculation unit 16 may determine that the operation has converged. Note that the conversion determination method to be used is not limited to any specific method, and any method may be used.

As described above, according to this embodiment, it is possible to perform position and orientation calculation while efficiently switching between a high-speed mode and a high-accuracy mode in accordance with a fitting degree, by using a polygon model for a large residual difference and using a piecewise parametric curved surface model for a small residual difference.

First Modification of First Embodiment

The first embodiment is configured to select a model for each three-dimensional point. In contrast to this, the first modification is configured to select a model based on the comparison between the sum total of residual differences for the respective three-dimensional points and a threshold. That is, the first modification is configured to select either a polygon model or a piecewise parametric curved surface model for one target object.

This modification also uses the information processing apparatus 1 having the arrangement shown in FIG. 1, but differs from the first embodiment in the following point. The following will mainly describe the difference from the first embodiment. Assume that this modification is the same as the first embodiment unless otherwise specified.

The processing performed by the information processing apparatus 1 according to this modification to obtain the position and orientation of a target object will be described with reference to the flowchart of FIG. 4, which shows the processing. Note that since the processing in steps S402, S403, S407, and S409 in FIG. 4 is the same as that in steps S302, S303, S309, and S311 in FIG. 3, a description of these steps will be omitted. The following will describe the processing in steps S404 to S406 and S408.

<Processing in Step S404>

The degree-of-matching calculation unit 17 initializes a degree of matching Err with respect to a target object. The degree-of-matching calculation unit 17 sets a value (for example, 1000) much larger than an estimated position and orientation residual difference as the initial value of the degree of matching. Assume that in this modification, a degree of matching with respect to a target object is the sum total of residual differences with respect to the respective three-dimensional points on a surface of the target object.

<Processing in Step S405>

The model selection unit 14 compares the degree of matching Err with a threshold ψ. A value based on the shape difference between a polygon model and a piecewise parametric curved surface model can be used as the threshold ψ. When, for example, generating a polygon model by performing tessellation processing for CAD data is used as a piecewise parametric curved surface model, a value ψ=N×θ is set, which value is obtained by using the value θ used in the first embodiment.

If this comparison result indicates that Err≥ψ, large differences are expected to still exist between three-dimensional points and the selected model. In such a case, therefore, the model selection unit 14 selects, from the model holding unit 11, a polygon model allowing fast geometrical calculation as a model to be used by the distance calculation unit 15.

If Err<ψ, the differences between the three-dimensional points and the selected model are estimated to be almost equal to a model approximation difference. In such a case, therefore, the model selection unit 14 selects, from the model holding unit 11, a piecewise parametric curved surface model expressing an accurate shape as a model to be used by the distance calculation unit 15.

<Processing in Step S406>

The distance calculation unit 15 places the model selected in step S405 at the position and orientation indicated by the current position and orientation information and obtains, for each three-dimensional point, the distance (distance between the correspondent points) d_i between the three-dimensional point and a correspondent point on the placed model which corresponds to the three-dimensional point. The processing for obtaining the distance between the correspondent points is the same as that described in the first embodiment.

<Processing in Step S408>

The degree-of-matching calculation unit 17 obtains the residual differences er_i with respect to the respective three-dimensional points kc_i and obtains the sum of the differences as the degree of matching Err, as described in the first embodiment.

Second Modification of First Embodiment

The first modification of the first embodiment uses the total sum of differences as a degree of matching. It is possible to use various other types of indices which can be applied as degrees of matching. This modification will exemplify a case (case 1) in which the number of times of modification of position and orientation information is used as a degree of matching and a case (case 2) in which the amount of change (modification amount) in position and orientation information is used as a degree of matching.

This modification also uses the information processing apparatus 1 having the arrangement shown in FIG. 1, but differs from the first embodiment in the following point. The following will mainly describe the difference from the first embodiment. Assume that this modification is the same as the first embodiment unless otherwise specified. The processing performed by the information processing apparatus 1 according to this modification to obtain the position and orientation of a target object modifies the following points in the processing of the flowchart of FIG. 4.

Case 1 will be described first. In step S404, the degree-of-matching calculation unit 17 initializes a variable k indicating the number of times of modification of position and orientation information (the number of times of execution of modification computation processing) to 0. In step S405, the model selection unit 14 selects a polygon model if the value of the variable k is less than a threshold. If the value of the variable k is equal to or more than the threshold, the model selection unit 14 selects a piecewise parametric curved surface model. The degree-of-matching calculation unit 17 may set in advance, as a threshold to be used at this time, a value (count) with which the modification of position and orientation information using a polygon model can be expected to converge. In step S408, the degree-of-matching calculation unit 17 increments the value of the variable k by one.

Case 2 will be described next. In step S404, the degree-of-matching calculation unit 17 initializes a variable ΔT indicating the distance between the position indicated by the position and orientation information before modification and the position indicated by the position and orientation after modification to a sufficiently large value (for example, 1000). In step S405, the model selection unit 14 selects a polygon model if the value of the variable ΔT is equal to or more than the threshold, or selects a piecewise parametric curved surface model if the value of the variable k is less than the threshold. In step S408, the degree-of-matching calculation unit 17 obtains the distance between the position indicated by the position and orientation before modification and the position indicated by the position and orientation information after modification, and sets the distance to the variable ΔT.

As described above, various other indices may be used as degrees of matching. For example, the apparatus may use the difference between the orientation indicated by the position and orientation information before modification and the orientation indicated by the position and orientation information after modification as ΔT. For example, the apparatus may estimate the differences between three-dimensional points and a three-dimensional model based on the sum or average of the distances that the points set on a model surface have moved before and after the modification of the position and orientation.

That is, the first and second modifications of the first embodiment select a model in accordance with the magnitude relationship between a threshold and an index value calculated in the repetitive process of modification. Other modifications can be made along with this arrangement.

Third Modification of First Embodiment

The first embodiment has exemplified the method of performing position and orientation calculation while switching between a polygon model and a piecewise parametric curved surface model based on a residual difference with respect to each three-dimensional point at a calculated position and orientation. However, it is possible to use other methods for determination when selecting a model. For example, the following will describe a method of switching between models based on the required accuracy for position and orientation estimation at each region on a surface of a target object and a method using tolerance information representing a shape difference from the design shape of a target object. The "region" in this case may be one entire target object or each portion of one target object.

The former method will be described first. According to this method, the apparatus sets an allowable value of the difference between a three-dimensional point and a model surface at a calculated position and orientation for each region of a shape model of a target object, and selects a model to be used based on the information. This method is configured to use a piecewise parametric curved surface model allowing accurate correspondence search at a region in which a three-dimensional point is to be fitted to the model surface with high accuracy and use a polygon model for other regions.

More specifically, first of all, the apparatus calculates the approximation difference between the shape of each polygon of each polygon model and the shape of a trimmed curved surface of a piecewise parametric curved surface model which expresses the corresponding shape in advance. In this case, this approximation difference will be called a polygon approximation difference. The apparatus sets the allowable value of the difference between a three-dimensional point and a model surface at a calculated position and orientation for each polygon of a polygon model. The apparatus then compares the polygon approximation difference set for each polygon with the allowable value of the difference to select a model used for position and orientation calculation.

More specifically, if the polygon approximation differences of polygons, of the polygons constituting a given region, which are equal to or more in number than a defined number are larger than the allowable value, since it indicates that the polygon approximation differences are larger than the allowable value of the difference at the polygons with respect to the region, the apparatus selects a piecewise parametric curved surface model. Note that it is possible to apply various conditions other than "if the polygon approximation differences of polygons, of the polygons constituting a given region, which are equal to or more in number than a defined number are larger than the allowable value". For example, it is possible to use the condition "if the average value of the polygon approximation differences of the polygons constituting a given region is larger than the allowable value of the region" instead of the above condition.

In contrast, if the condition "if the polygon approximation differences of polygons, of the polygons constituting a given region, which are equal to or more in number than a defined number are larger than the allowable value" is not satisfied, the apparatus selects a polygon model because the polygon approximation differences are smaller than the allowable value of the difference. Note that it is possible to apply various conditions other than this condition. For example, it is possible to use the condition "if the average value of the polygon approximation differences of the polygons constituting a given region is smaller than the allowable value of the region" instead of the above condition.

Note that the apparatus may set, as an attribute, a binary value indicating whether to fit a three-dimensional point to a model surface with high accuracy, instead of setting a continuous value as the allowable value of the difference, and select a model in accordance with this information. In addition, the user may select an attribute for each model.

A method using tolerance information representing a shape difference from the design shape of a target object will be described next. Assume that in this method, CAD data is provided with tolerance information representing a shape difference from the shape of a target object for each region. The apparatus selects a model to be used based on this information. Note that tolerance information may be obtained by actually measuring the three-dimensional shape of an object and comparing the measured shape with CAD data. According to this method, if the tolerance of a given region on a model surface is larger than a polygon approximation difference, the apparatus determines that it cannot expect to calculate an accurate distance between the correspondent points, and uses a polygon model. In contrast to this, if the tolerance is small, the apparatus determines that it can expect to calculate an accurate distance between the correspondent points, and uses a piecewise parametric curved surface model. More specifically, first of all, the apparatus calculates the approximation difference between the shape of each polygon of each polygon model and the shape of a trimmed curved surface of a piecewise parametric curved surface model which expresses the corresponding shape. Furthermore, the apparatus stores, for each polygon of a polygon model or each trimmed curved surface constituting a piecewise parametric curved surface model, the tolerance of a corresponding shape on CAD data in advance. The apparatus then compares the tolerance with the polygon approximation difference set for each polygon to select a model to be used for position and orientation calculation.

More specifically, if the polygon approximation differences of polygons, of the polygons constituting a given region, which are equal to or more in number than a defined number are larger than the tolerance of the region, the apparatus selects a piecewise parametric curved surface model with respect to the region. Note that it is possible to apply various conditions other than the condition "if the polygon approximation differences of polygons, of the polygons constituting a given region, which are equal to or more in number than a defined number are larger than the tolerance of the region". For example, it is possible to use the condition "if the average value of the polygon approximation differences of the polygons constituting a given region is larger than the tolerance of the region" instead of the above condition.

In contrast, if the condition "if the polygon approximation differences of polygons, of the polygons constituting a given region, which are equal to or more in number than a defined number are larger than the tolerance of the region" is not satisfied, the apparatus selects a polygon model because the difference of the object surface is large relative to the polygon approximation differences. Note that it is possible to apply various conditions other than this condition. For example, it is possible to use the condition "if the average value of the polygon approximation differences of the polygons constituting a given region is smaller than the tolerance of the region" instead of the above condition.

Note that it is possible to combine the above method with the first modification of the first embodiment. That is, it is possible to select a model to be used for the entire object by comparing a set allowable value or tolerance of difference with a polygon approximation difference.

Fourth Modification of First Embodiment

Although the first and second modifications of the first embodiment use a polygon model and piecewise parametric curved surface models as a three-dimensional shape model, the types of models to be used are not limited to them. It is possible to use any two types of models which differ in shape reproducibility accuracy. For example, it is possible to use a combination of a polygon model with an object surface being segmented more finely and a polygon model with an object surface being segmented more roughly or a combination of a plurality of piecewise parametric curved surface models which differ in the order of a curved surface. In addition, all the embodiments and their modifications can be applied to not only two type of models which differ in shape reproducibility accuracy in two steps but also a combination of models which differ in shape reproducibility accuracy in three or more steps.

Fifth Modification of First Embodiment

In each of the first to fourth modifications of the first embodiment, when positioning the three-dimensional points obtained from a range image and a model, the apparatus calculates the distances (the distances between the correspondent points) between the three-dimensional points and the model while switching between models in accordance with defined conditions. The apparatus then performs positioning based on these distances. In contrast to this, there is available a method of performing positioning based on the correspondence relationship between geometrical features (to be simply referred to as features hereinafter) on the captured image obtained by imaging a target object and geometrical features (to be simply referred to as features hereinafter) of the model. Such a method is disclosed in, for example, T. Drummond and R. Cipolla, "Real-time visual tracking of complex structures", IEEE Transactions on Pattern Analysis and Machine Intelligence, vol. 24, no. 7, pp. 932-946, 2002. In such a positioning method, when calculating the distances between the correspondent points between the features detected on a captured image and the features of a model, the apparatus may use the methods described in the first embodiment and its first to fourth modifications.

More specifically, first of all, the apparatus acquires the captured image obtained by imaging a target object from a point of view at a predetermined position and extracts features on the captured image. This captured image can be, for example, a gray image. A feature can be, for example, an edge. It is possible to extract edges from a captured image according to a conventional technique such as filtering processing.

The apparatus then detects the positions of features of the model. More specifically, assume that the apparatus has acquired a coarse position and orientation indicating the coarse position and orientation relationship between a point view on a captured image and a target object, and has placed the point of view and the model according to the acquired position and orientation. In this case, the apparatus calculates a projection image including an image of the model when the placed model is seen from the placed point of view. The apparatus then calculates the positions of the features of the model in the projection image. The features of the model can be, for example, the contour lines of the model. More specifically, the features of a polygon model may be the edges of polygons or the outer contours of the model in the projection image. The method of extracting features from a projection image including an image of a model is explained above. On the other hand, the apparatus may extract the coordinate values of contour lines or edges from a model in advance and project the coordinate values on an image based on a coarse position and orientation, thereby calculating the positions of model features in the projection image. The features of a piecewise parametric curved surface model may be the contour lines of trimmed curved surfaces constituting the piecewise parametric curved surface model or the outer contours of the model in the projection image.

A model to be used in this case is selected according to the method described in each of the first embodiment and its first to fourth modifications. For example, if it is determined, in accordance with the fitting degree of a position and orientation, that the positional difference between a target object and a model is large, it is possible to perform position and orientation calculation at high speed by using a polygon model. If the positional difference between a target object and a model is small, it is possible to accurately perform position and orientation calculation by using a piecewise parametric curved surface model.

The apparatus then determines the features of the model which correspond to the features on the captured image, and detects the distances between the corresponding features. For example, out of the features of the model, a feature nearer to the position of a feature on the captured image in the projection image can be determined as a feature of the model which corresponds to the feature on the captured image. In this manner, the apparatus associates the features on the captured image with the features of the selected model, and decides the geometrical features of the selected model which correspond to the geometrical features on the captured image, thereby calculating the distances between the correspondent points. In this manner, the apparatus can perform positioning by using the distances between the correspondent points which are detected with respect to the respective features on the captured image. Although coordinate values representing the positions of edges are used as features to be used for positioning in this case, positioning may be performed by using coordinates representing the positions of edges and vectors representing the directions of the edges.

Second Embodiment

According to the position and orientation calculation method described in the first embodiment, when selecting a piecewise parametric curved surface model, the distances between the correspondent points with respect to a plurality of trimmed curved surfaces are calculated in a search using three-dimensional points and corresponding piecewise parametric curved surfaces. In addition, when calculating the distances between the correspondent points with respect to the respective trimmed curved surfaces, whether a calculated point exists on an effective region representing an object shape is determined. For these reasons, when selecting a piecewise parametric curved surface model, it takes much time to perform calculation processing for the distances between the correspondent points.

This embodiment will therefore exemplify a method of speeding up calculation processing for the distances between the correspondent points by associating each polygon of a polygon model with a piecewise parametric curved surface in advance. More specifically, first of all, the apparatus specifies a model surface (a surface on a piecewise parametric curved surface model) corresponding to a three-dimensional point via a polygon model. It is possible to search for the correspondence between a polygon and a three-dimensional point at high speed by using the same method as that described in the first embodiment. Thereafter, when calculating the distance from a three-dimensional point to a model surface, the apparatus calculates an accurate value by using curved surface parameters for a piecewise parametric curved surface associated with a polygon. These kinds of processing can calculate the distances between the correspondent points between a three-dimensional point and a model surface even when selecting a piecewise parametric curved surface model.

An example of the functional arrangement of an information processing apparatus 2 according to this embodiment will be described with reference to the block diagram of FIG. 5. The same reference numerals as in FIG. 1 denote the same functional units in FIG. 5, and a description of them will be omitted.

A model holding unit 51 holds (manages) a polygon model approximating the shape of a target object with a plurality of polygons and a piecewise parametric curved surface model approximating the shape of the target object with parametric curved surfaces. In addition to this, in this embodiment, each polygon of a polygon model is provided with the ID of a trimmed curved surface of a piecewise parametric curved surface model which corresponds to the polygon. If, for example, the model holding unit 51 holds the polygon model and the piecewise parametric curved surface model respectively shown in FIGS. 2A and 2B, the polygon of the hatched portion in FIG. 2B is provided with the ID of the trimmed curved surface of the hatched portion in FIG. 2A.

A search unit 54 searches for a polygon corresponding to each three-dimensional point acquired by a surface position acquisition unit 12 from the polygon model held in the model holding unit 51. A distance calculation unit 55 calculates the distance between the correspondent points between each three-dimensional point acquired by the surface position acquisition unit 12 and a model surface. More specifically, the distance calculation unit 55 refers, for each three-dimensional point, to a trimmed curved surface with the ID provided to the polygon corresponding to the three-dimensional point, and calculates the distance between the correspondent points between the three-dimensional point and the model surface by using the curved surface parameters.

Figure 6:
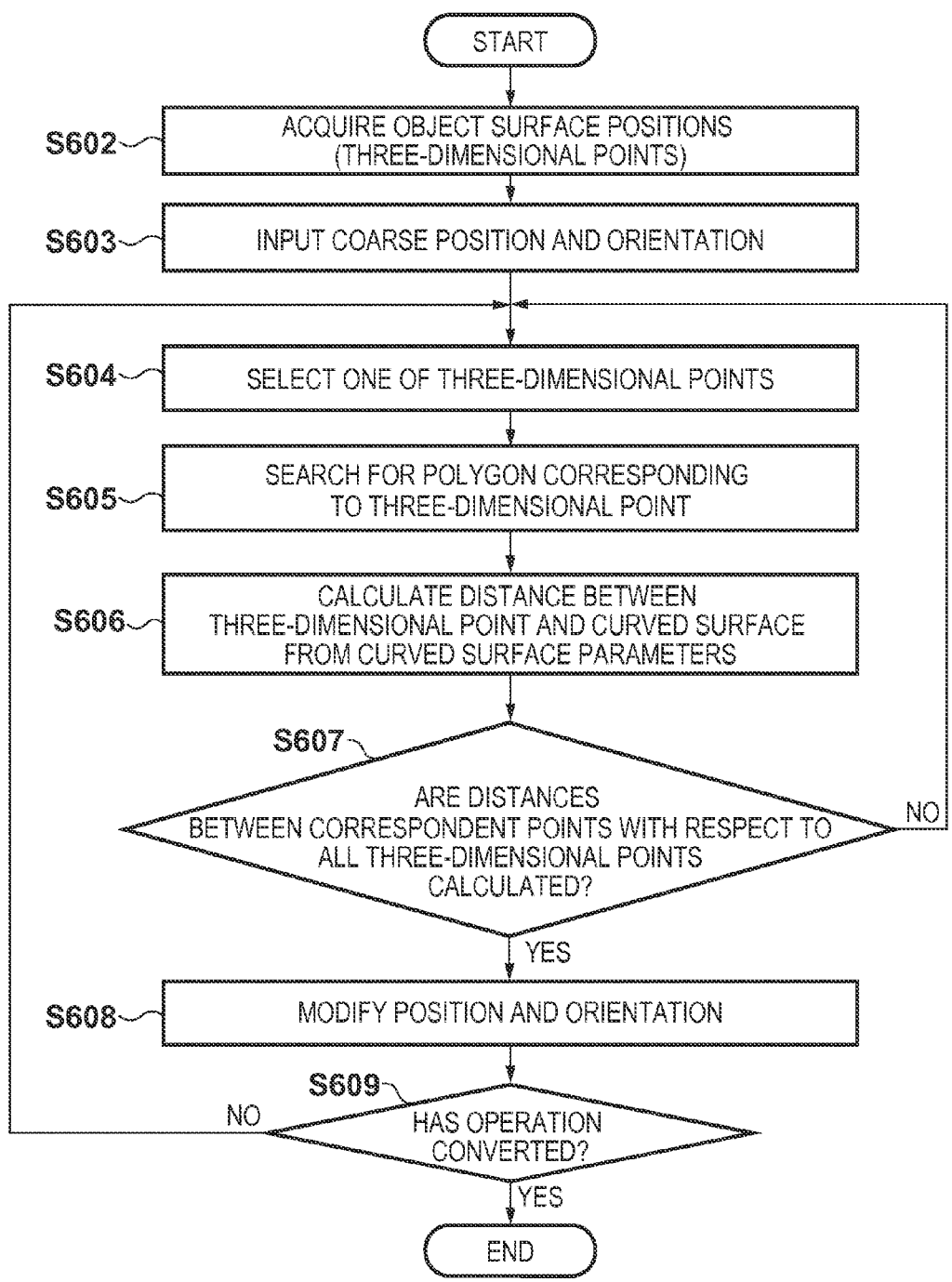
FIG. 6 is a flowchart showing processing performed by the information processing apparatus 2.

The processing performed by the information processing apparatus 2 according to this embodiment to obtain the position and orientation of a target object will be described next with reference to the flowchart of FIG. 6, which shows the processing. Since the processing in steps S602 to S604 and S607 to S609 in FIG. 6 is the same as that in steps S302, S303, S305, S308, S309, and S311 in FIG. 3, a description of these steps will be omitted.

For the sake of simplicity, the following description is based on the assumption that a piecewise parametric curved surface model is selected. This embodiment is applied to a case in which a piecewise parametric curved surface model is selected in the first embodiment (steps S605 and S606 in particular).

<Processing in Step S605>

The search unit 54 searches for a polygon corresponding to the three-dimensional point selected in step S604 from the polygon model held in the model holding unit 51. In this step, the search unit 54 performs a search at high speed by the same processing as that performed when a polygon model is selected in step S307.

<Processing in Step S606>

The distance calculation unit 55 specifies a correspondent point on the model surface which corresponds to the three-dimensional point selected in step S604, and calculates the distance between the three-dimensional point and the correspondent point (the distance between the correspondent points).

More specifically, the distance calculation unit 55 obtains a position km_i' by transforming the position of a three-dimensional point kc_i defined in a reference coordinate system into a position in the model coordinate system defined by the position and orientation indicated by the current position and orientation information. The distance calculation unit 55 then specifies a correspondent point pm_i corresponding to the three-dimensional point on the piecewise parametric curved surface model placed at the position and orientation indicated by the current position and orientation information and obtains a distance (the distance between the correspondent points) d_i between the position of the correspondent point pm_i and the position km_i'.

Figure 7A:
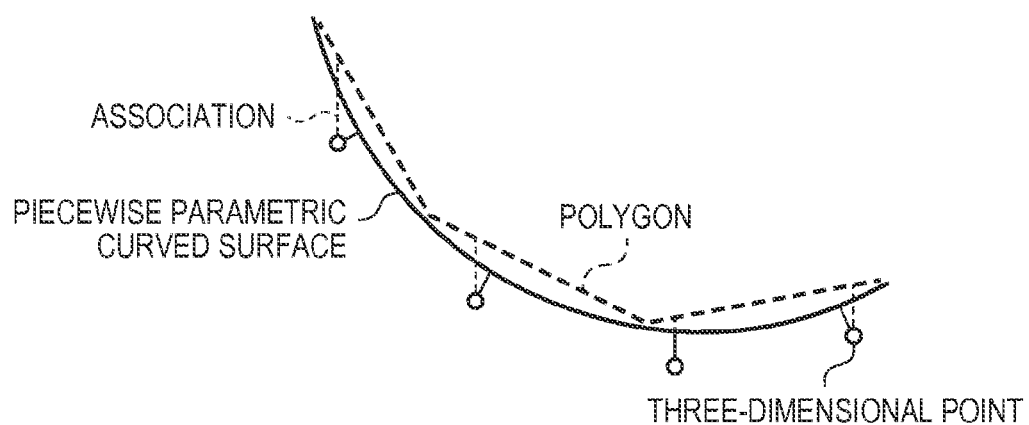
FIGS. 7A and 7B are views showing three-dimensional points in a model coordinate system.
Figure 7B:
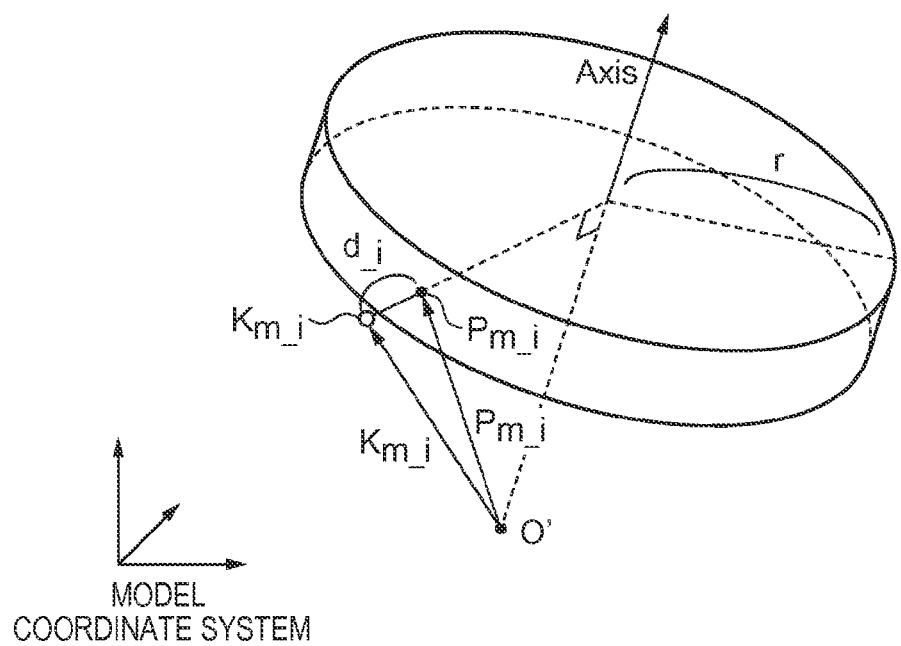

FIGS. 7A and 7B show that each three-dimensional point is transformed into a point in a model coordinate system based on the current position and orientation information. Each white circle represents a three-dimensional point, and each thin broken line represents the correspondence between each three-dimensional point and a polygon. The distance calculation unit 55 therefore calculates only the distance between the polygon and the trimmed curved surface associated with the polygon. The circular column in FIG. 7B is a base curved surface expressing a trimmed curved surface of the hatched portion in FIG. 2A. The circular column is expressed by three parameters, namely coordinates O' of the origin defining an axis serving as the rotation center of the circular column, a three-dimensional vector axis indicating the direction of the axis serving as the rotation center, and a radium r of the circular column in the model coordinate system. In this case, the distance d_i between km_i' and the circular column in the model coordinate system is calculated by $$d\_i = \text{abs}(km\_i' - \text{abs}(axis \cdot km\_i') \times axis)) - r$$

where a·b represents the inner product of vector a and vector b, and km_i' represents a vector expressed by km_i'=km_i−O'. FIG. 7A shows line segments indicating the distances from the respective three-dimensional points to the trimmed curved surface. The distance calculation unit 55 also calculates the coordinates of the three-dimensional point pm_i having the shortest distance from the three-dimensional point to the trimmed curved surface. In this case, the calculated distance d_i and the model point pm_i are recorded together with the three-dimensional point. The case in which a trimmed curved surface is a circular column has been described in detail above. When using another type of trimmed curved surface, it is possible to execute this embodiment by using a known method of calculating a correspondent point on a curved surface which corresponds to a three-dimensional point and the distance between the correspondent points from curved surface parameters.

As described above, this embodiment can uniquely specify a trimmed curved surface corresponding to a three-dimensional point by one correspondence search with a polygon, and hence can omit correspondence search processing with a plurality of trimmed curved surfaces. This makes it possible to calculate the distance between the correspondent points between a three-dimensional point and a model surface at high speed even when modifying position and orientation information by using a piecewise parametric curved surface model. Note that the method of calculating the distance between the correspondent points described in this embodiment may be applied to obtain the distance between the correspondent points when selecting a piecewise parametric curved surface model in the first embodiment.

Although each embodiment and each modification described above have exemplified various cases, each is merely an example of the arrangement described below. That is, each arrangement is configured to acquire position and orientation information indicating the coarse position and orientation of a target object and select, as selected model information, one of a plurality of pieces of model information differing in reproducibility accuracy with respect to the shape of the target object which is decided in accordance with defined conditions. This arrangement then places the model represented by the selected model information at the position and orientation indicated by the above position and orientation information and calculates an evaluation value for the distance between a point on the target object and a correspondent point on the placed model which corresponds to the point, thereby estimating the position and orientation of the target object based on the evaluation value.

First Modification of Second Embodiment

This modification is configured to obtain the distance between a three-dimensional point and a polygon corresponding to the three-dimensional point. If the obtained distance is less than a threshold, the modification calculates an accurate distance again by using a piecewise parametric curved surface model. This makes it possible to calculate a position and orientation while efficiently switching the high speed mode and the high accuracy mode by evaluating the difference between a three-dimensional point and a model surface before the execution of modification of the position and orientation.

This modification also uses the information processing apparatus 2 having the arrangement shown in FIG. 5, but differs from the second embodiment in the following point. The following will mainly describe the difference from the second embodiment. Assume that this modification is the same as the second embodiment unless otherwise specified.

Figure 8:
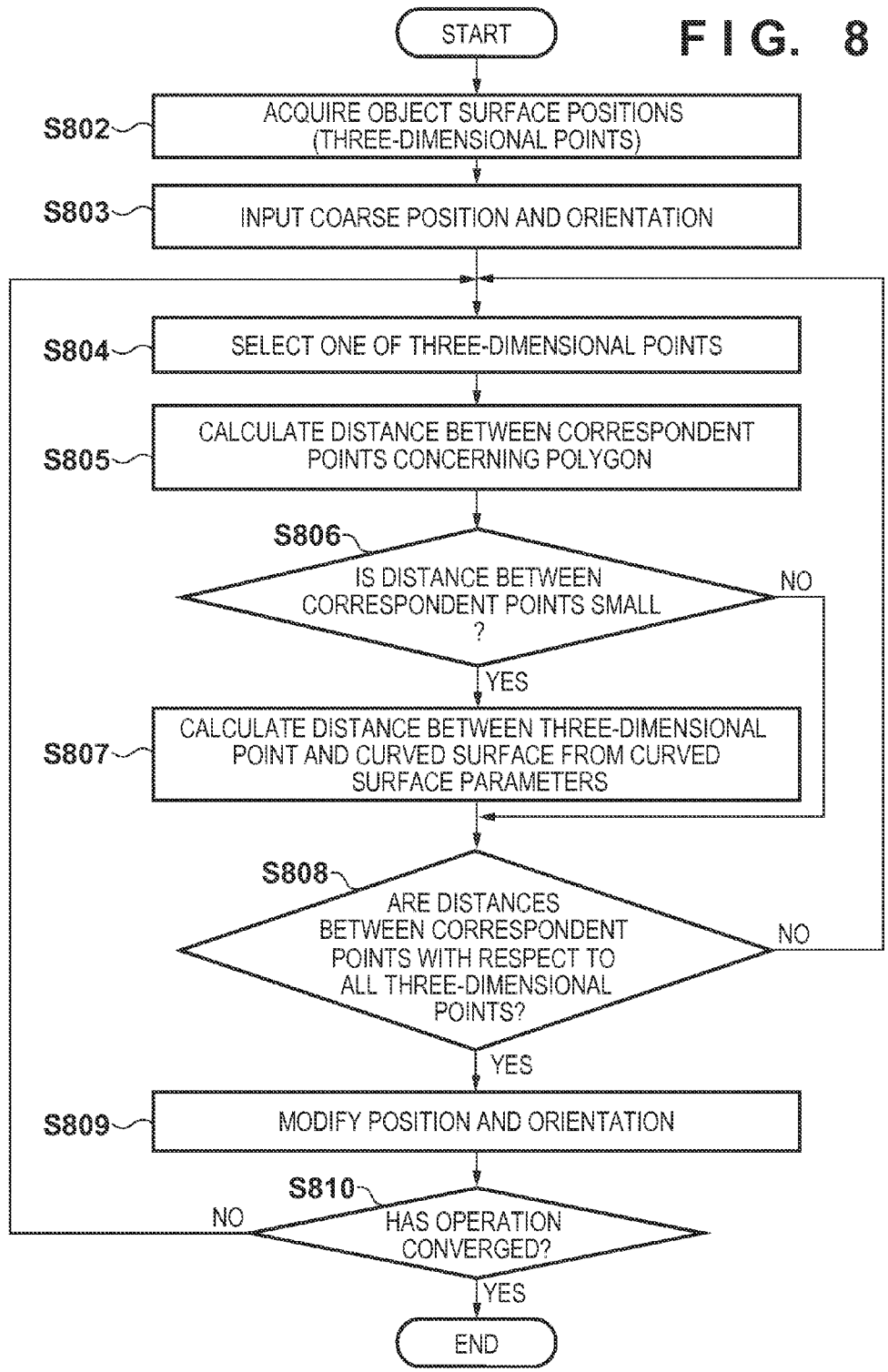
FIG. 8 is a flowchart showing processing performed by the information processing apparatus 2.

The processing performed by the information processing apparatus 2 according to this modification to obtain the position and orientation of a target object will be described with reference to the processing flowchart of FIG. 8. Note that since the processing in steps S802 to S804 and S808 to S810 in FIG. 8 is the same as that in steps S302, S303, S305, S308, S309, and S311 in FIG. 3, a description of these steps will be omitted.

<Processing in Step S805>

The search unit 54 searches for a polygon corresponding to the three-dimensional point kc_i selected in step S804 from the polygon model held in the model holding unit 51. In this step, the search unit 54 performs a search at high speed by the same processing as that performed when a polygon model is selected in step S307 described above.

<Processing in Step S806>

The distance calculation unit 55 specifies a correspondent point on the polygon which corresponds to the three-dimensional point kc_i selected in step S804, and calculates the distance (the distance between the correspondent points) d_i between the three-dimensional point kc_i and the correspondent point. The distance calculation unit 55 compares the distance d_i with a threshold $\phi$. Like the threshold $\theta$ used in the first embodiment, as the threshold $\phi$, the value of the shape difference between a polygon model and a piecewise parametric curved surface model is set in advance.

If the comparison result indicates that $d\_i \geq \phi$, since it indicates that the difference between the three-dimensional point and the model surface at the position and orientation indicated by the current position and orientation information is still large, the distance calculation unit 55 transmits the distance d_i to a position and orientation calculation unit 16. The process then advances to step S808.

If $d\_i < \phi$, it indicates that the difference between the three-dimensional point and the model surface at the position and orientation indicated by the calculated position and orientation information is almost equal to the model approximation difference. In this case, the process advances to step S807 to calculate the distance between the correspondent points again by using a piecewise parametric curved surface model expressing an accurate shape.

<Processing in Step S807>

The distance calculation unit 55 refers to the trimmed curved surface with the ID provided to the polygon corresponding to the three-dimensional point selected in step S804 to calculate the distance between the correspondent points between the three-dimensional point and a correspondent point on the model surface which corresponds to the three-dimensional point. That is, the distance calculation unit 55 performs the same processing as that in step S606 described above. The distance calculation unit 55 then transmits this distance between the correspondent points to the position and orientation calculation unit 16.

As described above, this modification can calculate a position and orientation while efficiently switching between the high speed mode and the high accuracy mode by evaluating the difference between a three-dimensional point and a model surface before the execution of modification of position and orientation information.

Second Modification of Second Embodiment

The second embodiment uses a three-dimensional shape model as a combination of a polygon model and a piecewise parametric curved surface model. However, the model combining method to be used is not limited to this. For example, a combination of a plurality of models capable of switching the levels of tradeoff between the speed of correspondence search and the accuracy of an object shape to be expressed may be held as three-dimensional shape models so as to allow the selection of a model from them. That is, first of all, the apparatus specifies a portion (for example, a portion of a surface like a polygon surface) corresponding to a point on a target object by using model information with lower reproducibility accuracy. The apparatus then specifies a portion (for example, a portion of a surface like a trimmed curved surface of a parametric curved surface) corresponding to the specified portion from the model represented by model information with higher reproducibility accuracy. Finally, the apparatus calculates the evaluation value of the distance between the point on the target object and a correspondent point on the portion specified from the model represented by the model information with the higher reproducibility accuracy.

Third Modification of Second Embodiment

The second embodiment has exemplified the method of calculating the distance between the correspondent points at high speed by using the association between each polygon of a polygon model and a piecewise parametric curved surface representing the same shape when positioning the three-dimensional points obtained from a range image with a model. This method may be applied to positioning described in the fifth modification in the first embodiment based on the correspondence relationship between geometrical features on the captured image obtained by imaging a target object and the geometrical features extracted from a model surface. For example, a geometrical feature may be an edge. More specifically, this method may be applied to positioning based on the correspondence relationship between line segments (geometrical features) representing edges on the captured image obtained by imaging a target object and the line segments (geometrical features) extracted from a model plane. That is, first of all, the apparatus determines the features of the polygon model which correspond to the features on the captured image. The apparatus then refers to association information representing the features of the piecewise parametric curved surface which correspond to the features of the polygon model to select features of the piecewise parametric curved surface which correspond to the features on the captured image. In this manner, the apparatus associates the geometrical features of the first model represented by the first model information with lower reproducibility accuracy like a polygon model and the geometrical information of the second model represented by the second model information with higher reproducibility accuracy like a piecewise parametric curved surface model. This calculates the distance between the correspondent points between each feature on the captured image and a corresponding feature of the piecewise parametric curved surface. As described above, a feature of a polygon model may be an edge of a polygon, and a feature of a corresponding piecewise parametric curved surface may be a contour line of a piecewise parametric curved surface. The distance between each feature on the captured image and a curve conforming to curve parameters expressing the contour line which can be calculated in this manner can be used as an accurate distance between the correspondent points. As another positioning method, a similar method can be applied to positioning operation using edgelets each obtained by finely segmenting a line segment expressing an edge and expressed by coordinates and a direction.

Third Embodiment

This embodiment will exemplify, as an example of the purpose of use of the position and orientation information calculated by the method described in each of the first and second embodiments, their modifications, and the like, a system which causes a robot to manipulate a target object having the position and orientation indicated by the position and orientation information.

Figure 9:
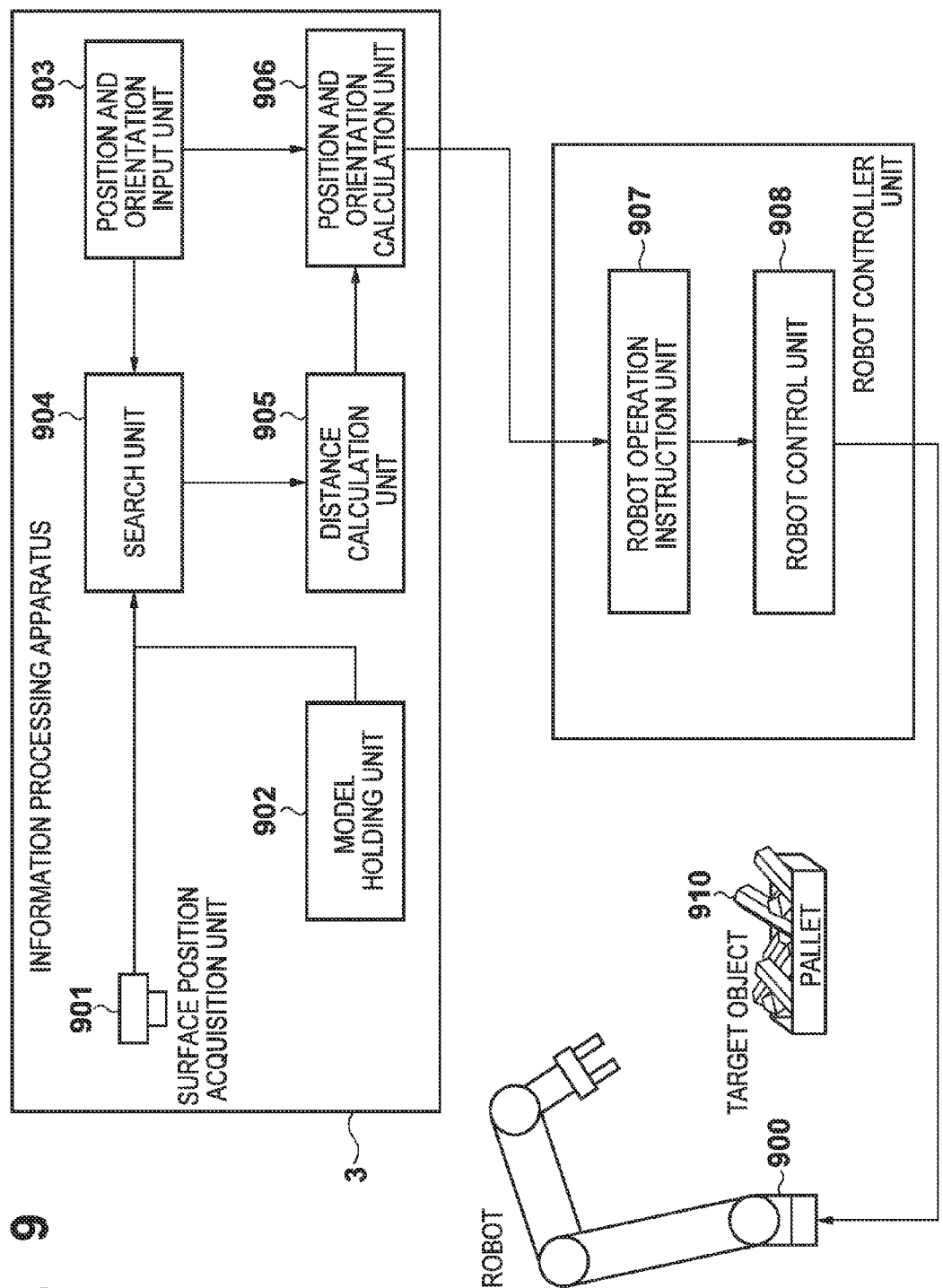
FIG. 9 is a block diagram showing the arrangement of a system.

An example of the arrangement of the system according to this embodiment will be described with reference to FIG. 9. As shown in FIG. 9, the system includes an information processing apparatus 3, a robot controller unit, and a robot 900.

The robot 900 is a multi-joint robot and operates upon receiving a control instruction from the robot controller unit. A hand as an end effector is attached to the distal end of the arm of the robot 900. This allows the robot to work on a target object. This embodiment uses a hand having a chuck mechanism capable of gripping a target object as an end effector. This robot may use, as an end effector, a motor-driven hand or a suction pad chucks a target object with air pressure. Assume that a known technique is used before the execution of this embodiment to calibrate the relative position and orientation between the robot 900 and a surface position acquisition unit 901 and the relative position and orientation between the arm of the robot 900 and the end effector. This can transform the position and orientation calculated by a position and orientation calculation unit 906 into those in a workspace coordinate system fixed in the space in which the pallet is placed. In addition, it is possible to control the robot so as to set the hand at the position and orientation designated in the workspace coordinate system. Note however that the robot may be an NC-controllable movable mechanism instead of a multi-joint robot.

The surface position acquisition unit 901 captures a range image of a target object 910 and acquires the position of each three-dimensional point on a surface of the target object 910 by using the captured range image. That is, the basic operation of the surface position acquisition unit 901 is the same as that of a surface position acquisition unit 12. Therefore, the surface position acquisition unit 901 may be fixed to a portion near the hand of the robot 900 or somewhere in the workspace coordinate system. Assume that the surface position acquisition unit 901 is constituted by a compact projector and a camera. The surface position acquisition unit 901 captures a range image by a spatial encoding method. Alternatively, the surface position acquisition unit 901 may capture a range image by a stereo method using a stereo camera or by a light-section method using a laser projector and a camera or any other methods.

The target object 910 is a part of an industrial product. The robot 900 picks up parts and assembles them into a product. It is possible to use various materials such as plastic, metal, and vinyl. A plurality of target objects 910 are stacked on a pallet at various positions and orientations.

A search unit 904, a model holding unit 902, a distance calculation unit 905, a position and orientation calculation unit 906, and a position and orientation input unit 903 are respectively the same functional units as the search unit 54, the model holding unit 51, the distance calculation unit 55, the position and orientation calculation unit 16, and the position and orientation input unit 13. The position and orientation calculation unit 906 transmits the position and orientation of the target object 910, obtained finally, to a robot operation instruction unit 907.

The robot operation instruction unit 907 generates a control instruction to make the arm of the robot 900 move to the position and orientation received from the position and orientation calculation unit 906 and perform gripping or chucking operation, and transmits the instruction to a robot control unit 908. Obviously, however, the operations of the robot are not limited to moving, gripping, and chucking operations, and include other operations such as appearance check on a target object.

The robot control unit 908 controls the robot 900 in accordance with this control instruction to make the arm of the robot 900 move to the position and orientation indicated by the position and orientation information obtained by the position and orientation calculation unit 906 and perform desired operation (gripping or moving the target object 910).

Figure 10:
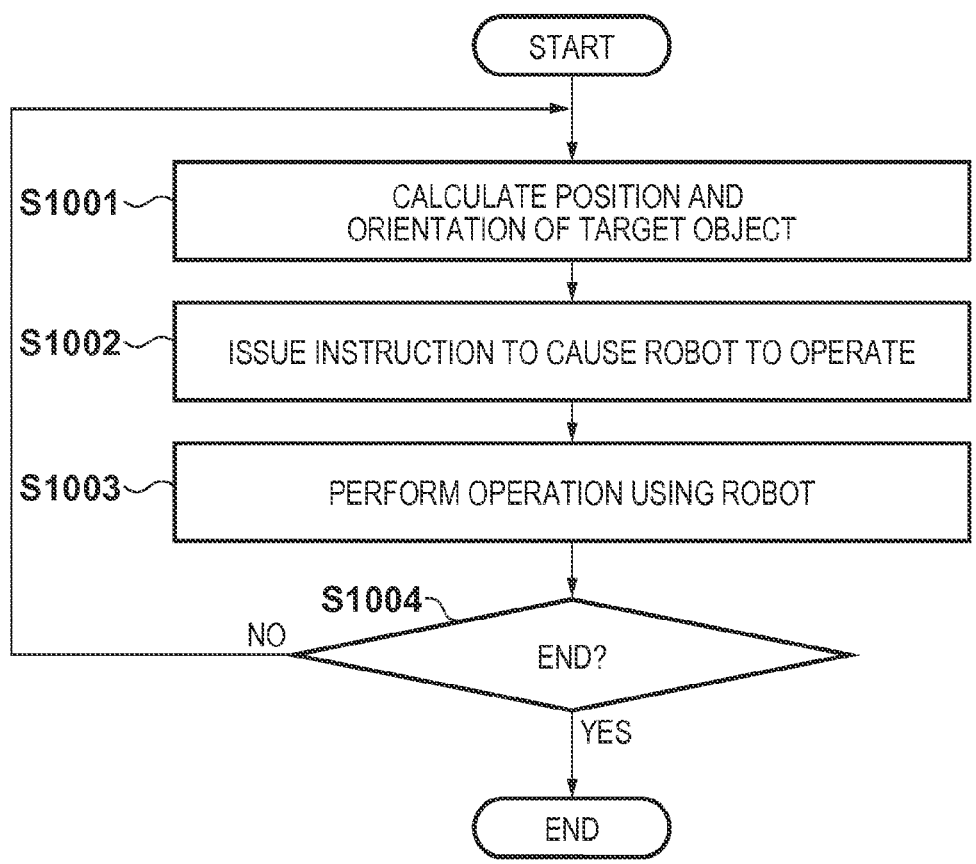
FIG. 10 is a flowchart showing the operation of the system.

The operation of the above system will be described with reference to the flowchart of FIG. 10. First of all, in step S1001, the information processing apparatus 3 obtains the position and orientation of the target object 910. In step S1002, the information processing apparatus 3 transmits the obtained position and orientation to the robot control unit. The robot controller unit therefore transmits a control instruction to the robot 900 to make it perform desired operation for the target object 910 at this position and orientation.

In step S1003, the robot 900 operates in accordance with this control instruction. This system repeats the processing in steps S1001 to S1003 unless the user inputs a stop instruction (step S1004).

Note that as the arrangement of the information processing apparatus 3 and the position and orientation calculation method, any those in the first and second embodiments and their modifications can be used. When using them, the arrangement or processing may be modified as needed.

Fourth Embodiment

Figure 2A:
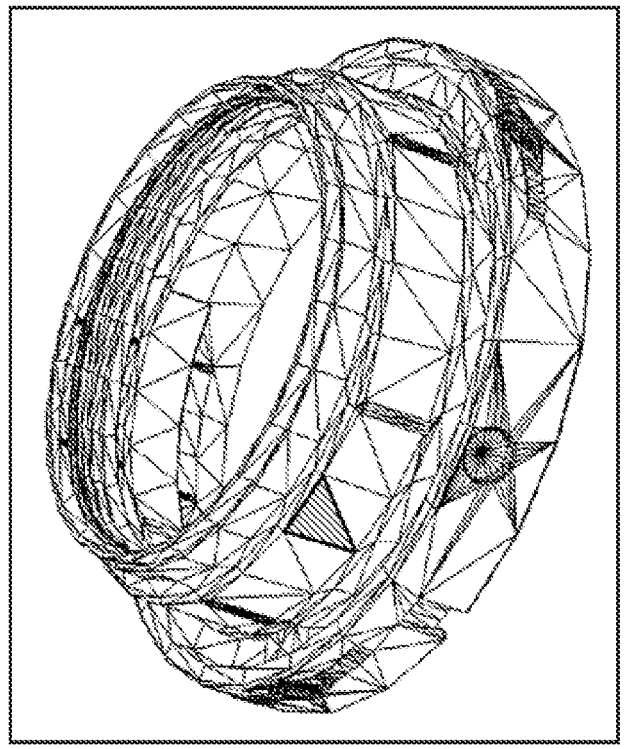
FIGS. 2A and 2B are views for explaining a polygon model and a piecewise parametric curved surface model.
Figure 2B:
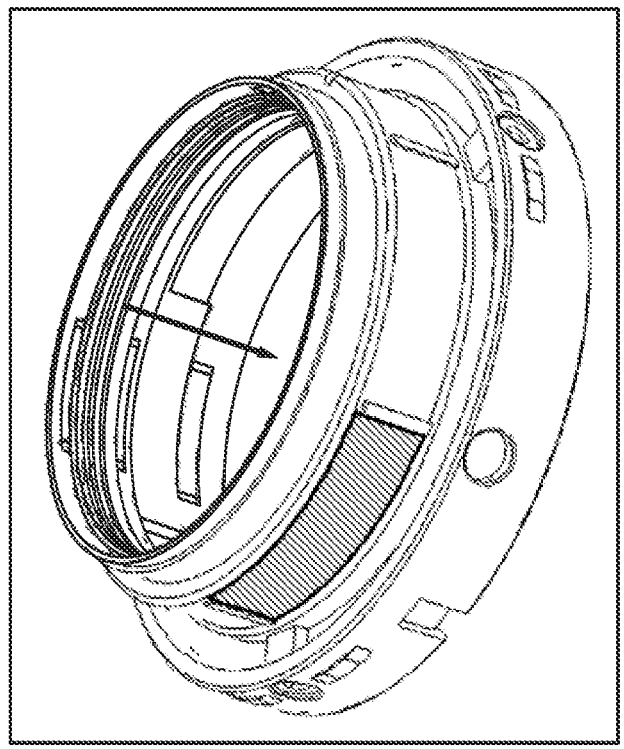
Figure 5:
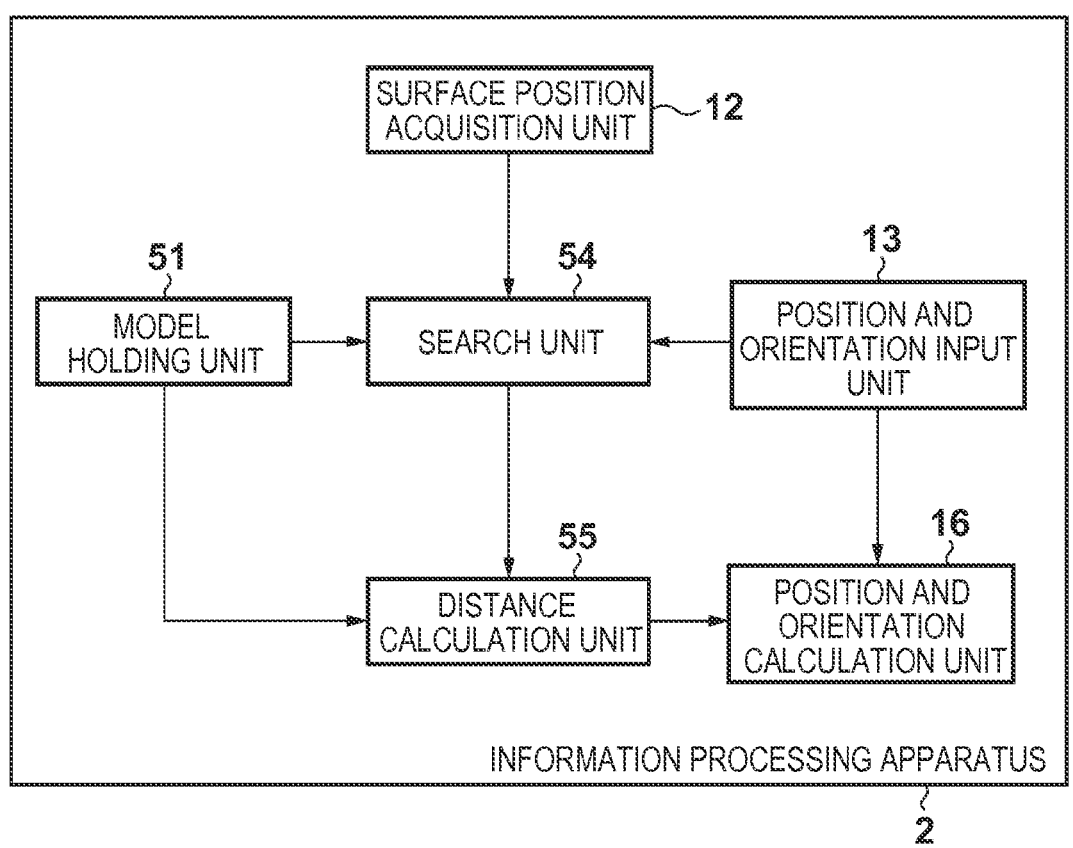
FIG. 5 is a block diagram showing an example of the functional arrangement of an information processing apparatus 2.

Each unit in the information processing apparatus 1 shown in FIG. 1, each unit in the information processing apparatus 2 shown in FIG. 5, and each unit in the information processing apparatus 3 shown in FIG. 9 may be implemented by hardware. Alternatively, the model holding unit 11, 51, or 902 may be formed by a memory, and each of the remaining units may be implemented by computer programs.

In this case, a general PC (Personal Computer) or the like can be applied to the information processing apparatuses 1 to 3. For example, the model holding unit 11, 51, or 902 is formed in a hard disk, and computer programs for making a CPU execute the functions of the respective units other than the model holding unit are stored in the hard disk. The CPU of the PC reads the computer programs and data stored in the hard disk to the RAM, and executes processing by using the read programs and data, thereby making the PC function as the information processing apparatuses 1 to 3. In addition, the respective embodiments and modifications described above may be combined as needed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-188074, filed Aug. 28, 2012, and No. 2013-118301, filed Jun. 4, 2013, which are hereby incorporated by reference herein in their entirety.

What is claimed is:

1. An information processing apparatus comprising:
an image acquisition unit configured to acquire an image including a target object;
a position and orientation unit configured to acquire a coarse position and orientation of the target object;
a holding unit configured to hold information of a plurality of models, each of which indicate a shape of the same target object, wherein each of the plurality of models indicate the shape of the target object with different accuracies;
an associating unit configured to associate a geometrical feature of the target object in the acquired image with a geometrical feature indicated by at least one of the plurality of models placed at the coarse position and orientation; and
an estimation unit configured to estimate a position and orientation of the target object based on the result of association.

2. The information processing apparatus according to claim 1, wherein the associating unit is further configured to select a model out of the plurality of models in accordance with a predetermined condition, and to associate the geometrical feature of the target object and the geometrical feature indicated by the selected model.

3. The information processing apparatus according to claim 2, wherein the associating unit comprises a selection unit configured to select a model out of the plurality of models based on comparison between an index value calculated while repeating the estimation and a threshold, and
the estimation unit comprises:
a unit configured to place the selected model at the coarse position and orientation or the estimated position and orientation, and to obtain a distance between each geometrical feature on a surface of the target object and a corresponding geometrical feature indicated by the selected model; and
a unit configured to estimate a position and orientation based on the distance obtained for each geometrical feature on the surface of the target object.

4. The information processing apparatus according to claim 3, wherein the selection unit is further configured to select a model out of the plurality of models based on a degree of matching with the target object, and
the estimation unit further comprises a unit configured to obtain the degree of matching based on a distance between each of geometrical features on the surface of the target object and a corresponding geometrical feature indicated by the selected model placed at the estimated position and orientation.

5. The information processing apparatus according to claim 3, wherein the selection unit is further configured to select a model out of the plurality of models based on the number of times of execution of the estimation.

6. The information processing apparatus according to claim 3, wherein the selection unit is further configured to select a model out of the plurality of models based on a difference in position between the coarse position before the estimation and the estimated position after the estimation.

7. The information processing apparatus according to claim 3, wherein the selection unit is further configured to select a model out of the plurality of models based on a difference in orientation between the coarse orientation before the estimation and the estimated orientation after the estimation.

8. The information processing apparatus according to claim 2, wherein the estimation unit comprises:
a selection unit configured to select, for each region of the target object, one of a parametric curved surface model approximating a shape of the region with a parametric curved surface, and a polygon model approximating the shape of the region with polygons, based on an approximation difference of the polygon model relative to the parametric curved surface model;
a unit configured to place the selected model for each region of the target object at the coarse position and orientation, and to obtain a distance between each geometrical feature on a surface of the target object and a corresponding geometrical feature indicated by the selected model, and
a unit configured to estimate a position and orientation based on the distance obtained for each geometrical feature on the surface of the target object.

9. The information processing apparatus according to claim 2, wherein the estimation unit comprises:
a selection unit configured to select, for each region of the target object, one of a parametric curved surface model approximating a shape of the region with a parametric curved surface, and a polygon model approximating the shape of the region with polygons, based on a tolerance of the shape of the target object;
a unit configured to place the selected model for each region of the target object at the coarse position and orientation, and to obtain a distance between each geometrical feature on a surface of the target object and a corresponding geometrical feature indicated by the selected model; and
a unit configured to estimate a position and orientation based on the distance obtained for each geometrical feature on the surface of the target object.

10. The information processing apparatus according to claim 2, wherein the estimation unit comprises:
a selection unit configured to select, for each geometric feature on a surface of the target object, a polygon model approximating the shape of the target object with polygons if a residual difference with respect to the geometrical feature is not less than a threshold, and a parametric curved surface model approximating the shape of the target object with a parametric curved surface if the residual difference is less than the threshold;
a computation unit configured to place the selected model regarding the geometrical feature at the coarse position and orientation, and to obtain a distance between the geometrical feature and a corresponding geometrical feature of the placed model;

a modification unit configured to modify the coarse position and orientation based on the distance obtained for each geometrical feature on a surface of the target object; and a unit configured to place the selected model for each geometrical feature on a surface of the target object at the modified coarse position and orientation, and to obtain a distance between the geometrical feature and a corresponding geometrical feature of the selected model as the residual difference with respect to the geometrical feature.

11. The information processing apparatus according to claim 1, wherein the holding unit is further configured to hold information of a first model and a second model associated with each region of the target object, wherein the second model is more precise than the first model, and the associating unit further comprises a specifying unit configured to specify a geometrical feature of the first model, by associating a geometrical feature of the target object in the image with a geometrical feature of the first model placed at the coarse position and orientation, and the associating unit is further configured to associate a geometrical feature of a second model, which is associated with the specified geometrical feature of the first model, with the geometrical feature of the target object.

12. The information processing apparatus according to claim 11, wherein:

the first model is a polygon model; and the second model is a piecewise parametric curved surface model.

13. The information processing apparatus according to claim 11, wherein the specifying unit is further configured to:

calculate a distance between the geometrical feature of the target object and a corresponding geometrical feature of the first model; and estimate a position and orientation of the target object, by using an evaluation value of the calculated distance regarding the geometrical feature for which the calculated distance is not less than a threshold, and by using a result of association using the second model regarding the geometrical feature for which the calculated distance is less than a threshold.

14. The information processing apparatus according to claim 1, further comprising:

a unit configured to acquire an image of a target object captured from a point of view at a predetermined position; and a unit configured to extract a geometrical feature from the captured image;

wherein the estimation unit is further configured to:

project a model selected from the plurality of models on the image based on the coarse position and orientation, wherein the plurality of model indicate a shape of the target object with different accuracy; and estimate the position and orientation of the target object based on the extracted geometrical feature and a corresponding geometrical feature of the projected model.

15. The information processing apparatus according to claim 1, further comprising a unit configured to transmit an instruction to a control unit configured to control a robot, wherein the instructions causes the robot to move to the estimated position and orientation.

16. An information processing method for processing data in an information processing apparatus including at least a position and orientation input unit, an associating unit, and an estimation unit, the method comprising:

acquiring an image including a target object;

acquiring a coarse position and orientation of the target object with the position and orientation input unit;

holding information, in a memory of the information processing apparatus, of a plurality of models, each of which indicate a shape of the same target object, wherein each of the plurality of models indicate the shape of the target object with different accuracies;

associating, with the associating unit, a geometrical feature of the target object in the acquired image with a geometrical feature indicated by at least one of the plurality of models placed at the coarse position and orientation; and estimating, with the estimation unit, a position and orientation of the target object based on the result of association by the associating unit.

17. A non-transitory storage medium storing a program for instructing a computer to:

acquire an image including a target object;

acquire a coarse position and orientation of the target object;

hold information of a plurality of models which indicate a shape of the target object with different accuracy;

associate a geometrical feature of the target object in the acquired image with a geometrical feature indicated by at least one of the plurality of models placed at the coarse position and orientation; and estimate a position and orientation of the target object based on the result of association.

* * * * *